(12) United States Patent
Tenor

(10) Patent No.: US 8,047,221 B1
(45) Date of Patent: Nov. 1, 2011

(54) CENTERING VALVE BOX ADAPTER

(76) Inventor: David Tenor, Green Bay, WI (US)

( * ) Notice: Subject to any disclaimer, the term of this patent is extended or adjusted under 35 U.S.C. 154(b) by 771 days.

(21) Appl. No.: 12/176,817

(22) Filed: Jul. 21, 2008

Related U.S. Application Data

(60) Provisional application No. 60/965,816, filed on Aug. 23, 2007.

(51) Int. Cl.
*F16L 5/00* (2006.01)

(52) U.S. Cl. ......... 137/367; 137/365

(58) Field of Classification Search ......... 248/220.21, 248/224.7, 300, 346.5, 73; 137/365, 367, 137/370
See application file for complete search history.

(56) References Cited

U.S. PATENT DOCUMENTS

| | | | |
|---|---|---|---|
| 4,534,378 A | 8/1985 | Gagas et al. | |
| 4,819,687 A * | 4/1989 | Alberico et al. | 137/367 |
| 6,226,929 B1 | 5/2001 | Gagas | |
| 6,354,325 B1 * | 3/2002 | Warnes et al. | 137/367 |
| 6,449,908 B2 * | 9/2002 | Gagas | 137/367 |
| D546,924 S | 7/2007 | Gagas | |
| D548,309 S | 8/2007 | Gagas | |

OTHER PUBLICATIONS

American Flow Control, Trench Adapter and Retrofit Valve Box Insert, 12 pages, date unknown.

* cited by examiner

*Primary Examiner* — John Rivell
*Assistant Examiner* — R. K. Arundale
(74) *Attorney, Agent, or Firm* — Brannen Law Office, LLC

(57) ABSTRACT

A centering valve box adapter is provided for supporting a bonnet over a valve box to maintain vertical access to the valve box nut. A plurality of retainers can be affixed to the valve box using the bolts on the valve box. Each retainer has a lip and a keeper. Each keeper has a vertical hole. A plurality of brackets can also be provided. Each bracket can have an interface, an extension and a riser. The interface can be removably received within the hole of the keeper. The plurality of retainers and respective brackets form an assembly that defines a perimeter. A bonnet can be vertically supported on the respective extensions of the brackets. The bonnet is self centering and is laterally bound by the perimeter defined by the risers. The retainers and brackets can be made of stainless steel.

20 Claims, 7 Drawing Sheets

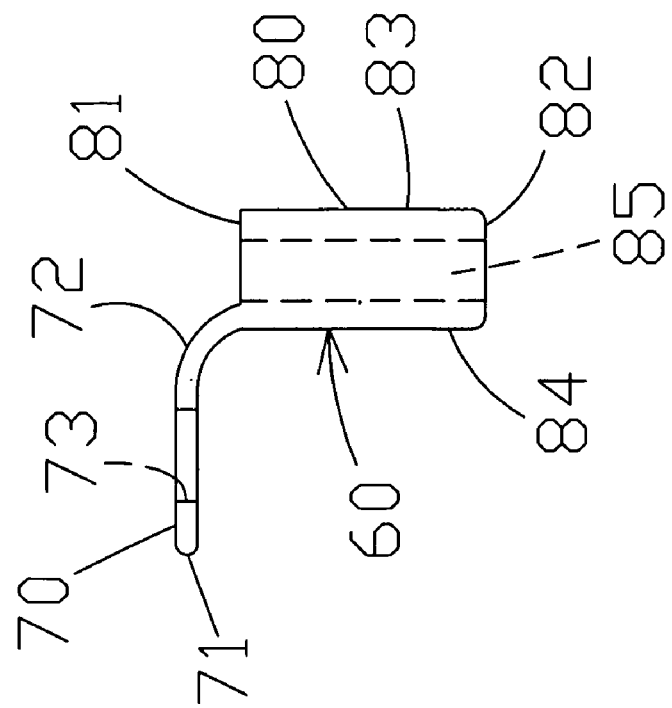
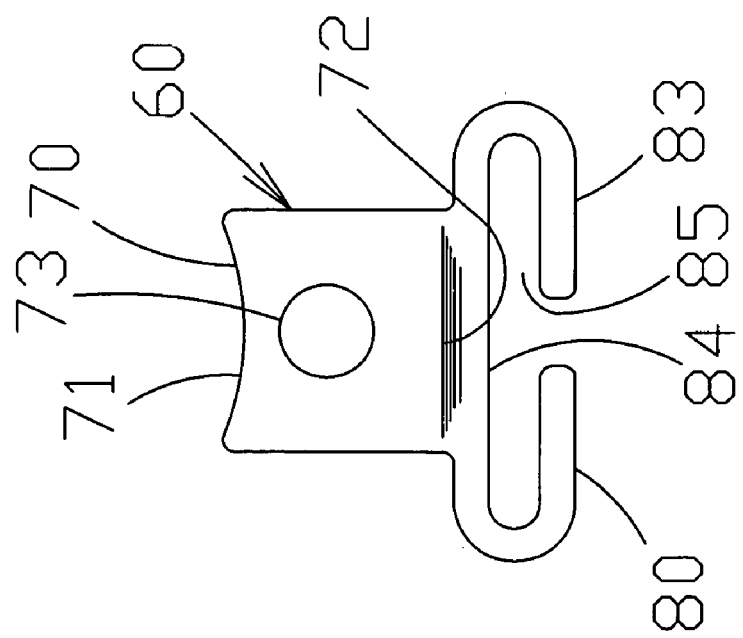

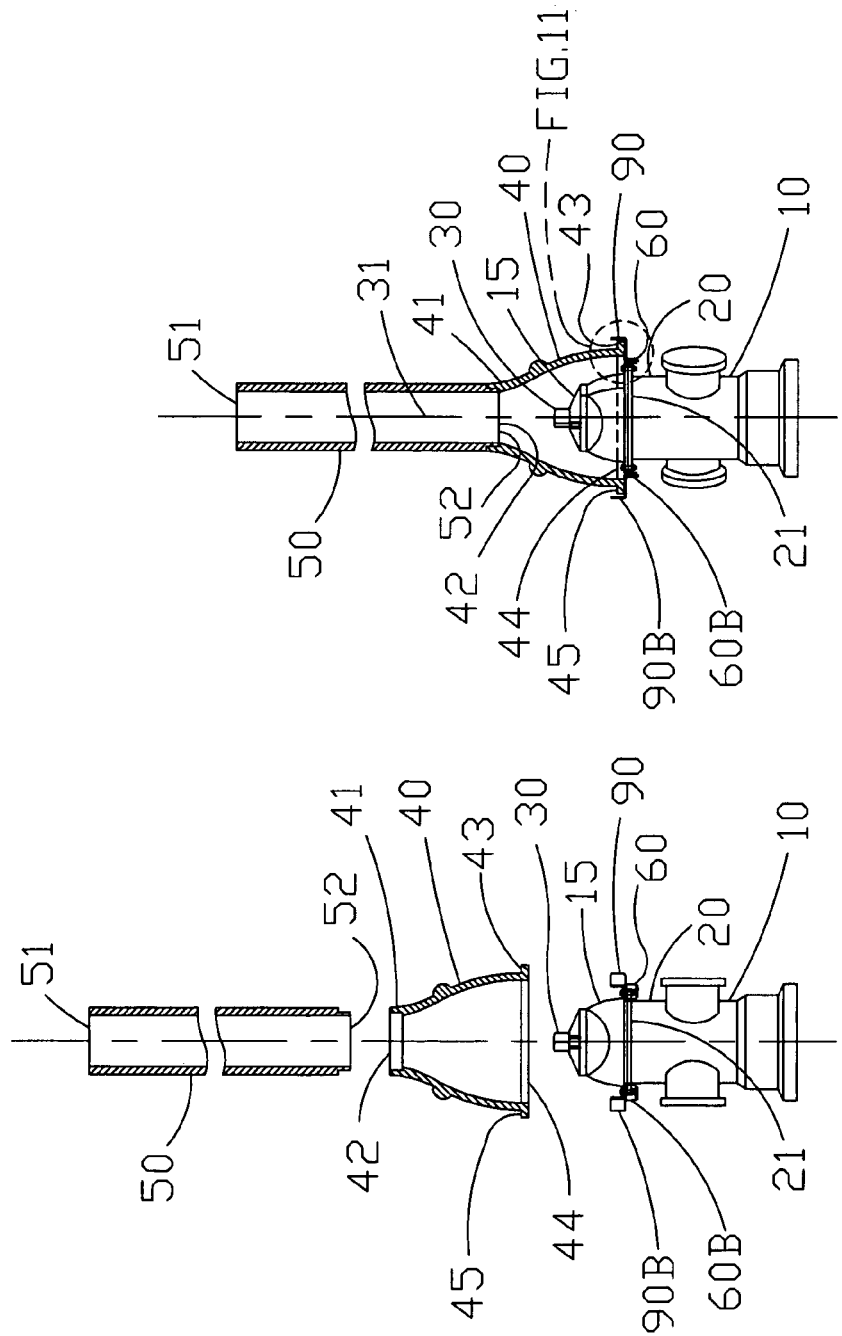

CENTERING VALVE BOX ADAPTER

This utility patent application claims priority on and the benefit of provisional application 60/965,816 filed Aug. 23, 2007, the entire contents of which are hereby incorporated herein by reference.

BACKGROUND OF THE INVENTION

1. Field of the Invention

The present invention relates to a centering valve box adapter that supports and centers a bonnet over a valve box to maintain vertical access to the valve box nut to eliminate the need for excavation by preventing shifting of the valve box.

2. Description of the Related Art

The use of valve boxes is well documented in the field of municipal water supply. It is important to install valves at certain intervals within the underground piping so that segments can be opened or closed upon direction of the interested party (be it governmental or private).

It is typical to place a bonnet and vertical pipe over the valve box to allow access to the valve, and in particular to a valve nut that is operable rotationally around the nut vertical axis. The top of the vertical pipe is preferably placed flush with the ground or manufactured surface, and a cover can be provided to restrict unauthorized access to the valve. In theory, a worker can remove the cover and access the valve nut via the vertical pipe with the use of a T-wrench. However, a major problem arises when the valve box moves, shifts or settles and the valve nut is no longer accessible via the vertical pipe. In this situation, excavation of the valve may be necessary. Of course, the excavation is associated with major costs, both in time and in dollars.

Several products have been developed over the years to combat the problems normally associated with shifting or settling of the valve boxes.

One such product is disclosed in U.S. Pat. No. 4,534,378 to Gagas et al., which is titled Gate Valve Adaptor. It is disclosed in this patent that an adaptor is provided for supporting a key box on an underground gate valve. The adapter is taught to include a rectangular metal ring adapted to be seated on the gate valve bonnet flange. A number of radially extending arms are positioned to engage the lower edge of the key box bonnet, and a resilient ring is positioned between the adaptor ring and the key box flange. The rectangular metal ring appears to be configured to match a specific size gate valve bonnet flange. While not problematic in some circumstances, the metal ring may not be useful with gate valve bonnet flanges of dimensions other than a specific size. Also, there appears to be little lateral support for the metal ring to prevent lateral movement that could occur during shifting of the gate valve box. Further, vertical support of the bonnet is dependent upon maintaining the location of the metal ring on top of the gate valve bonnet flange.

U.S. Pat. No. 6,226,929 to Gagas is titled Liquid Infiltration Prevention Structures for Preventing Liquid Infiltration Manhole Assemblies Gate Valve Sealing Structures for Preventing Settling or Shifting of Key Box Bonnets and Method for Using Said Structures. The adaptor is taught to be provided with a resilient gasket to provide a cushion and create a seal for the bonnet on the gate valve. Yet, the gasket itself will nevertheless be subjected to the environmental stresses. It is possible that the resiliency of the gasket can lead to the gasket being compromised if the valve box shifts, settles or otherwise moves.

U.S. Pat. Nos. Des. 546,924 and Des. 548,309 are both to Gagas and titled Gate Valve Sealing Structure. The ornamental designs of the sealing structure appear to simply rest on the valve box near the top of the valve box.

A further product is made by American Flow Control and is named Trench Adapter and Retrofit Valve Box Insert. A self centering alignment ring is provided having a sliding adjuster. The alignment ring appears to rest on the valve box directly beneath the valve nut.

None of these designs incorporate a low profile retainer extending beyond the rim of the upper portion of the valve box, and none of these designs incorporate brackets for vertically and laterally supporting a bonnet.

None of these designs show an assembly with a perimeter entirely outside of rim of the valve box to provide an increased support for increased stability.

None of these designs show a method of assembling the assembly to prevent shifting and settling of the valve box.

Thus there exists a need for a centering valve box adapter that solves these and other problems.

SUMMARY OF THE INVENTION

The present invention relates to a centering valve box adapter that supports and centers a bonnet over a valve box to maintain vertical access to the valve box nut without the need for excavation. In the preferred embodiment, a plurality of retainers can be affixed to the valve box using the bolts on the valve box. The retainers can be installed at the factory or at the job site. The retainers each have a lip that is flush with the top rim of the valve box, and a keeper is integral with and depends from the lip. Each keeper has a vertical hole. A plurality of brackets can also be provided. Each bracket can have an interface, an extension and a riser. The interface can be removably received within the hole of the keeper. The extension can be perpendicular to the interface, such that the extension lies in a plane that is approximately perpendicular to the central axis of the valve nut when installed. The riser can be parallel to the interface. The plurality of retainers and respective brackets form an assembly that defines a perimeter. A bonnet can be vertically supported on the respective extensions of the brackets. The bonnet is self centering, due to the invention's design to have the bonnet be laterally bound by the perimeter defined by the risers. The retainers and brackets can be made of stainless steel.

According to one advantage of the present invention, the assembly is self centering. This is accomplished by fixing the retainers with the bolts that hold the top and bottom sections of the valve box together. The retainers are then always positioned correctly. The brackets, when installed, are then always positioned correctly. The risers of the brackets define a perimeter within which the bonnet sits. The risers prevent the lateral movement of the bonnet. In this regard, it will not be possible for the bonnet to simply slide past the bracket, as the bonnet is actively retained. Because the retainers are laterally secure, the brackets are also secure in that they are in a fixed location with respect to the valve box.

The present invention further advantageously comprises an assembly to center the bonnet upon the valve box without the need for unnecessary materials. Given the cost of raw materials, especially corrosion resistant materials such as stainless steel, there is a great advantage to provide full structural benefits with minimal amounts of raw materials.

According to a further advantage of the present invention, the brackets hold the bonnet remote from the valve box. This is advantageous as the wide perimeter provided by the risers of the brackets provides a wide base conducive to stable support.

According to a further advantage yet of a preferred embodiment of the present invention, the retainers and brackets are constructed of stainless steel. In this regard, the components are strong and rigid, and also resistant to corrosion and rust. The effects of corrosion and rusting of components is a major problem when dealing with underground utilities.

Other advantages, benefits, and features of the present invention will become apparent to those skilled in the art upon reading the detailed description of the invention and studying the drawings.

BRIEF DESCRIPTION OF THE DRAWINGS

FIG. 3 is a top view of a preferred retainer of the present invention.

FIG. 4 is a side view of the retainer shown in FIG. 3.

FIG. 9 is an exploded side view of a valve box, a preferred embodiment of the present invention, a bonnet and a vertical access pipe.

FIG. 10 is a side view of a valve box, a preferred embodiment of the present invention, a bonnet and a vertical access pipe.

DETAILED DESCRIPTION OF THE PREFERRED EMBODIMENTS

While the invention will be described in connection with one or more a preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
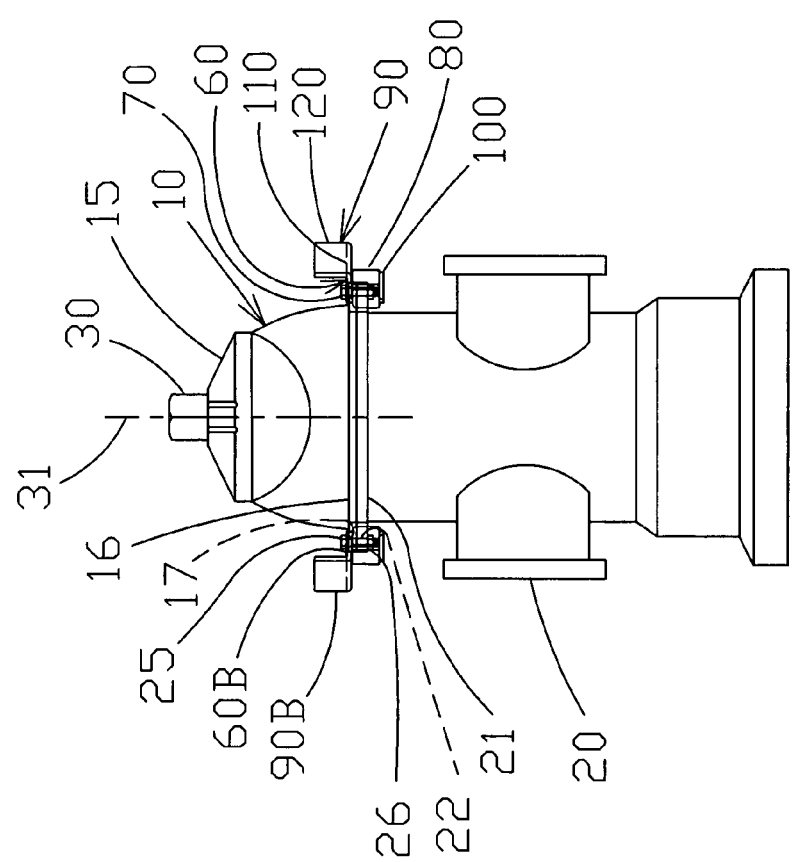
FIG. 1 is a side view of a preferred embodiment of the present invention installed on a standard valve box.
Figure 2:
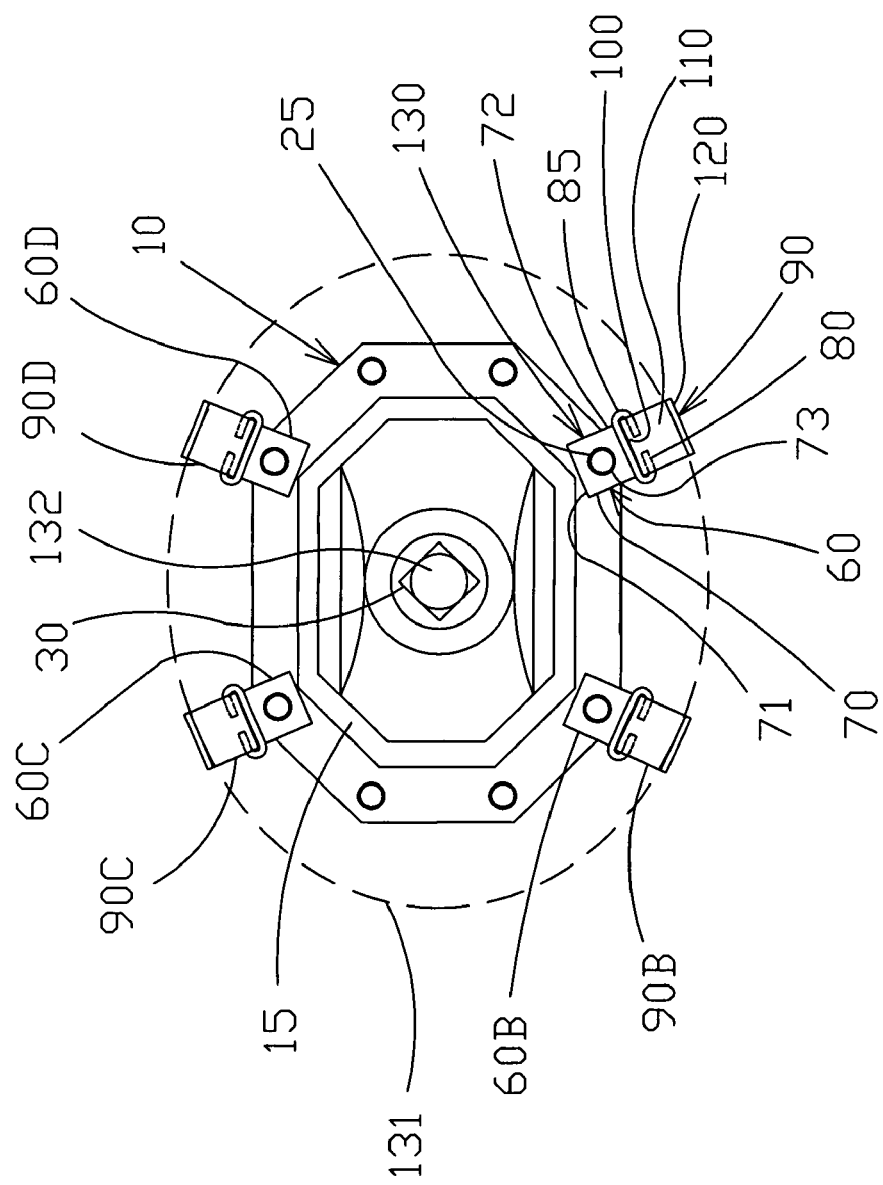
FIG. 2 is a top view of the embodiment shown in FIG. 1 shown installed on a valve box.

The present invention is useful with a valve box 10, such as the one illustrated in FIGS. 1 and 2. The valve box 10 has a top 15 and a bottom 20. The top 15 of the valve box 10 has a rim 16 with several bolt holes there through around the valve box perimeter. The bottom 20 also has a rim 21 with several bolt holes 22 there through around the valve box perimeter. The holes 17 are alignable with holes 22. Several bolts 25 and associated nuts 26 are designed to pass through holes 17 and 22.

A valve nut 30 typically extends from the top 15 of the valve box. The nut 30 is operable about or around a central vertical axis 31.

Figure 11:
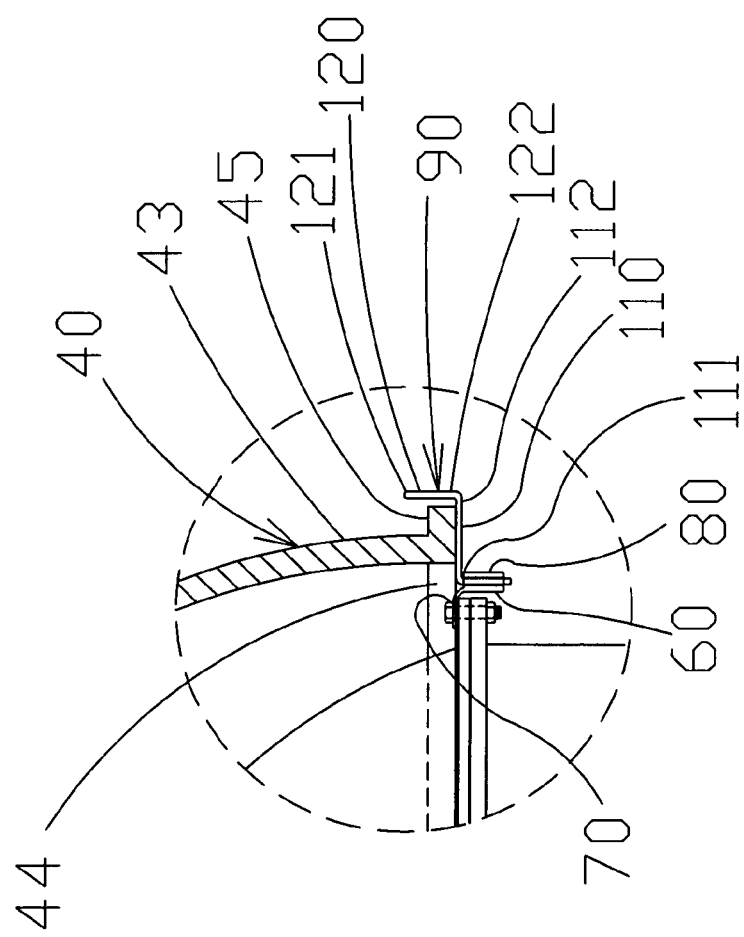
FIG. 11 is a close up taken along close-up circle 11 drawn in FIG. 10.

Looking now to FIGS. 9-11 a bonnet 40 is illustrated. The bonnet 40 has a top 41 and a bottom 43. A hole 42 is longitudinally formed through the top, and a hole 44 is at the bottom 41. The bottom 43 of the bonnet has a perimeter 45. A vertical pipe 50 having ends 51 and 52 is further illustrated. The top 51 of the vertical pipe 50 is preferably located at ground level and can be covered with a removable cover. The bottom 52 is normally connected to the bonnet 40, such that access within the bonnet can be made through hole 42 at the top of the bonnet.

Turning now to the present invention, it is seen that an assembly 130 comprising a retainer 60 and a bracket 90 are illustrated below. In the preferred embodiment, a plurality of retainers 60 and brackets 90 are provided. It has been found that four retainers (60, 60B, 60C and 60D) and brackets (90, 90B, 90C and 90D) accomplish the goals of the present invention. However, more or less retainers 60 and brackets 90 could be used without departing from the broad aspects of the present invention. The retainers 60 and brackets 90 are preferably made of stainless steel. Yet, it is appreciated that they could alternatively be made of other corrosion and rust resistant materials without departing from the broad aspects of the present invention.

Looking now to FIGS. 3 and 4, it is seen that a preferred embodiment of the retainer 60 is illustrated. In particular, the retainer 60 has a lip 70 and a keeper 80. The lip 70 has a first edge 71, a second edge 72 and a hole 73 there between, the hole extending between the top and bottom of the lip. The keeper 80 has a top 81, a bottom 82, a front 83 and a rear 84. The keeper defines a hole 85 between the top 81 and 82. The hole 85 is preferably a vertical hole.

Figure 6:
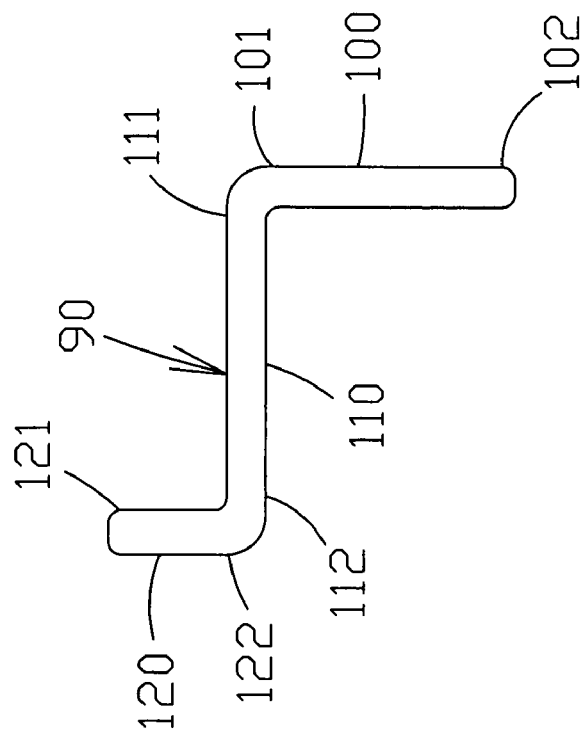
FIG. 6 is a side view of the bracket shown in FIG. 5.
Figure 5:
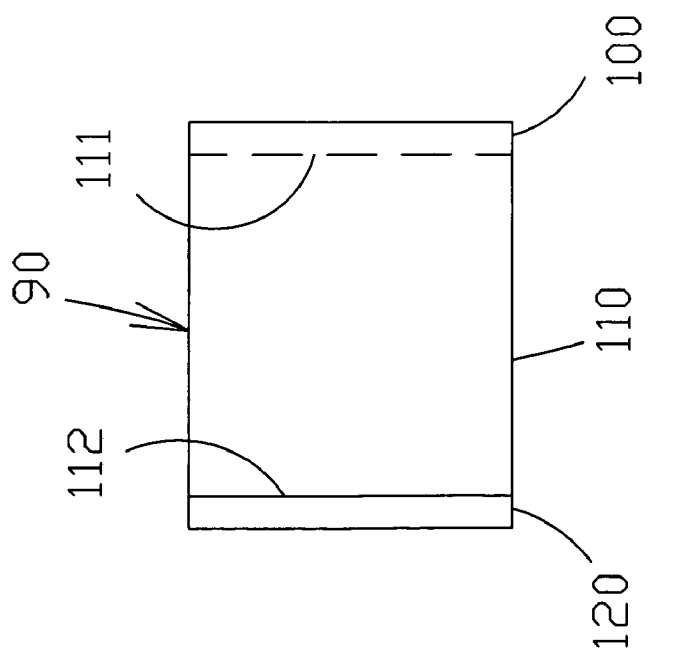
FIG. 5 is a top view of a preferred bracket of the present invention.

Looking now to FIGS. 5 and 6, it is seen that a preferred embodiment of the bracket 90 is illustrated. The bracket 90 has an interface 100, an extension 110 and a riser 120. The interface has a top 101 and a bottom 102. The extension 110 has ends 111 and 112. The riser 120 has a top 121 and a bottom 122. It is seen that the riser 120 is preferably parallel to the interface 100, and preferably perpendicular to the extension 110.

Figure 8:
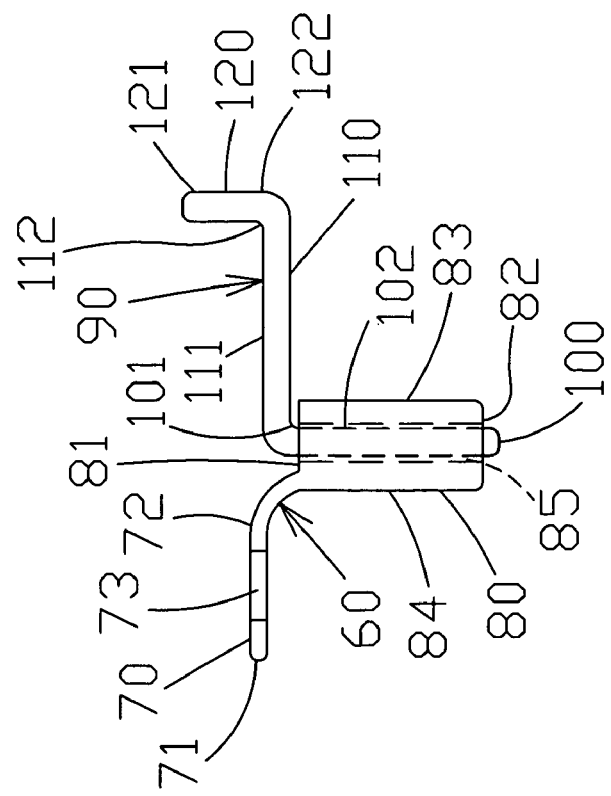
FIG. 8 is a side view of FIG. 7.
Figure 7:
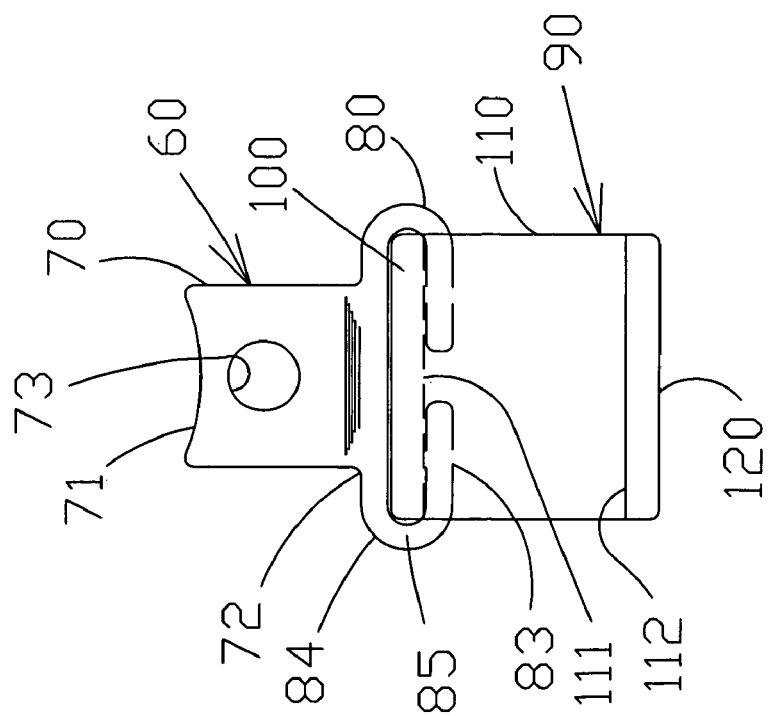
FIG. 7 is a top view of the preferred bracket shown in FIG. 5 removably received within the preferred retainer shown in FIG. 3.

Turning now to FIGS. 7 and 8, it is seen that the assembled relationship between the brackets 90 and retainers 60 is illustrated. In particular, the interface 100 is vertically removably received within the hole 85 of the keeper. The bracket 90 is laterally stationary with respect to the retainer 60, as the interface is received in the vertical plane. Looking at FIG. 11, it is seen that the retainer is laterally and vertically locked to the valve box 10. Because the retainer 60 is in a fixed position, the bracket 90 is also laterally fixed with respect to the valve box. When assembled, the brackets 60 60B, 60C and 60D are completely outside of the valve box perimeter.

The risers of the assembly 130 form a perimeter 131 with a center 132, as shown in FIG. 2. The perimeter is entirely outside of the valve box perimeter. The bonnet 40 rests on and is vertically supported outside of the valve box perimeter on the extensions of the brackets 90, 90B, 90C and 90D. In the preferred embodiment, there is about ¼ inch of clearance between the bonnet outer perimeter 45 at the bottom 43 and the risers 120 inner surfaces, respectively. The total lateral movement of the bonnet is preferably approximately ½ inch. The bonnet 40 can move to any position within the perimeter 131 and the nut 30 will remain accessible to a worker via vertical pipe 50 and the bonnet 40.

Thus it is apparent that there has been provided, in accordance with the invention, centering valve box adapter that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An assembly for providing support to a bonnet covering a valve box having a nut operational around a vertical axis via access through a vertical pipe and the bonnet, said assembly comprising:
   a plurality of retainers connected to the valve box; and
   a plurality of brackets, wherein each one of said plurality of brackets is removably received within and laterally locked by one of said plurality of retainers,
   wherein each of said plurality of brackets has a riser, and said risers of said plurality of brackets define a perimeter that laterally secures the bonnet by bounding the bonnet within the perimeter and centering the bonnet over the nut of the valve box, and
   wherein each of said plurality of brackets has an extension for vertically supporting the bonnet.

2. The assembly of claim 1 wherein:
   said plurality of retainers comprises four retainers; and
   said plurality of brackets comprises four brackets.

3. The assembly of claim 1 wherein:
   the valve box has a valve box top and a valve box bottom secured with valve box bolts; and
   said plurality of retainers each have a retainer lip with a lip hole there through, and are connected to the valve box by each of said plurality of retainers having a valve box bolt pass through the respective lip hole to lock each of said plurality of retainers in place with respect to the valve box.

4. The assembly of claim 1 wherein:
   each of said plurality of retainers has a vertically oriented keeper; and
   each of said plurality of brackets has an interface that is received within said vertically oriented keeper.

5. The assembly of claim 4 wherein each of said plurality of brackets has an extension that is generally perpendicular to the respective interface, whereby said plurality of extensions provide vertical support to the bonnet.

6. The assembly of claim 4 wherein each of said plurality of brackets has a riser that is generally parallel to the central axis of the nut of the valve box, whereby said plurality of risers define a perimeter to bound lateral movement of the bonnet.

7. The assembly of claim 4 wherein said perimeter defined by said risers has allows for approximately ½ inch of lateral movement within the perimeter in any direction.

8. The assembly of claim 4 wherein the entirety of said plurality of said brackets are located outside of a valve box perimeter defined by the valve box when said plurality of brackets are connected to said plurality of said retainers.

9. The assembly of claim 1 wherein:
   each of said plurality of retainers is comprised of stainless steel; and
   each of said plurality of brackets is comprised of stainless steel.

10. An assembly for providing support to a bonnet covering a valve box having a nut operational around a vertical axis via access through a vertical pipe and the bonnet, said assembly comprising:
    a plurality of retainers independently locked to the valve box; and
    a plurality of brackets, wherein each one of said plurality of brackets is removably received within and laterally secured and vertically supported by one of said plurality of retainers,
    wherein each of said plurality of brackets has a riser, and said risers of said plurality of brackets define a perimeter that laterally secures the bonnet by bounding the bonnet within the perimeter and centering the bonnet over the nut of the valve box, and
    wherein each of said plurality of brackets has an extension for vertically supporting the bonnet.

11. The assembly of claim 10 wherein:
    said plurality of retainers comprises four retainers; and
    said plurality of brackets comprises four brackets.

12. The assembly of claim 10 wherein:
    the valve box has a valve box top and a valve box bottom secured with valve box bolts; and
    said plurality of retainers each have a retainer lip with a lip hole there through, and are connected to the valve box by each of said plurality of retainers having a valve box bolt pass through the respective lip hole to lock each of said plurality of retainers in place with respect to the valve box.

13. The assembly of claim 10 wherein:
    each of said plurality of retainers has a vertically oriented keeper; and
    each of said plurality of brackets has an interface that is received within said vertically oriented keeper.

14. The assembly of claim 13 wherein each of said plurality of brackets has an extension that is generally perpendicular to the respective interface, whereby said plurality of extensions provide vertical support to the bonnet.

15. The assembly of claim 13 wherein each of said plurality of brackets has a riser that is generally parallel to the central axis of the nut of the valve box, whereby said plurality of risers define a perimeter to bound lateral movement of the bonnet, wherein the entirety of said plurality of said brackets are located outside of a valve box perimeter defined by the valve box when said plurality of brackets are connected to said plurality of said retainers.

16. An assembly for providing support to a bonnet covering a valve box having a nut operational around a vertical axis via access through a vertical pipe and the bonnet, the valve box having a plurality of bolts to secure a valve box top to a valve box bottom, said assembly comprising:
    a plurality of retainers wherein each of said plurality of retainers comprises:
      a lip secured to one of said plurality of bolts by having the bolt pass through said lip; and
      a keeper; and
    a plurality of brackets wherein each one of said plurality of brackets comprises:
      an interface connected to said keeper; and
      a riser,
    wherein each riser in said plurality of risers define a perimeter whereby the bonnet is laterally bound by the perimeter.

17. The assembly of claim 16 wherein each of said interfaces is received within one of said keepers of said plurality of retainers.

18. The assembly of claim 17 wherein each of said interfaces is vertically received within one of said plurality of retainers.

19. The assembly of claim 16 wherein the entirety of said plurality of said brackets are located outside of a valve box perimeter defined by the valve box when said plurality of brackets are connected to said plurality of said retainers.

20. The assembly of claim 16 wherein each of said plurality of brackets further comprises an extension between and generally perpendicular to said interface and said riser.

* * * * *